United States Patent [19]

Suzuki

[11] Patent Number: 4,582,159

[45] Date of Patent: Apr. 15, 1986

[54] PART-TIME FOUR-WHEEL DRIVE SYSTEM WITH BRAKING FORCE RESPONSIVE CONTROL

[75] Inventor: Kunihiko Suzuki, Sagamihara, Japan

[73] Assignee: Nissan Motor Company, Limited, Japan

[21] Appl. No.: 589,775

[22] Filed: Mar. 15, 1984

[30] Foreign Application Priority Data

Apr. 1, 1983 [JP] Japan ............................ 58-57261

[51] Int. Cl.$^4$ .................... B60K 23/08; F16H 37/00
[52] U.S. Cl. ................................. 180/247; 180/140; 180/142; 192/3.58; 74/740; 74/856
[58] Field of Search .............. 180/247, 140, 248, 249, 180/271, 245, 142, 3.58; 74/857, 866, 856, 867, 740; 192/61, 55, 62, 3.58

[56] References Cited

U.S. PATENT DOCUMENTS

| | | | |
|---|---|---|---|
| 3,548,980 | 12/1970 | Schmidt | 192/3.58 X |
| 3,756,358 | 9/1973 | Espenschied et al. | 192/3.58 X |
| 3,897,846 | 8/1975 | Inoue | 180/142 |
| 4,369,671 | 1/1983 | Matsumoto et al. | 74/740 X |
| 4,417,641 | 11/1983 | Kageyama | 180/247 |
| 4,441,572 | 4/1984 | Ito et al. | 180/140 |
| 4,470,489 | 9/1984 | Makita | 180/76 X |
| 4,484,654 | 11/1984 | Hayakawa | 74/867 X |

FOREIGN PATENT DOCUMENTS 55-83617  6/1980  Japan .
56-75220  6/1981  Japan .

Primary Examiner—Larry Jones
Attorney, Agent, or Firm—Lane and Aitken

[57] ABSTRACT

A four-wheel drive system of a part-time type having a two-wheel drive mode and a four-wheel drive mode is provided with an automatic control system for automatically changing the condition of the drive system from the two-wheel drive mode to the four-wheel drive mode when the braking force of the vehicle becomes equal to or higher than a predetermined value. The control system may have means for determining a coefficient of friction between the tire and road surface to change the drive system to the four-wheel drive mode at a low braking force level when the sensed coefficient of friction is low.

16 Claims, 6 Drawing Figures

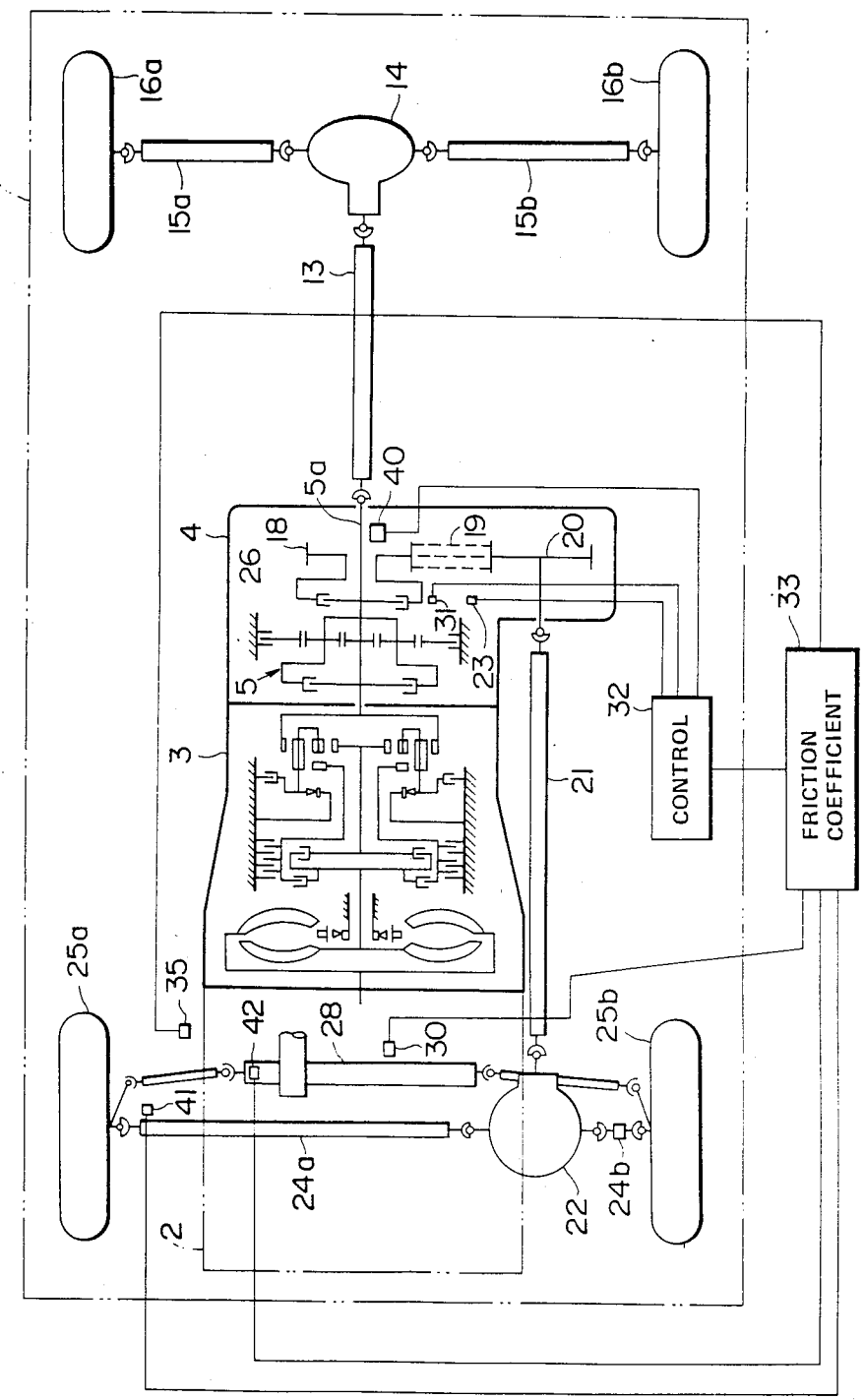

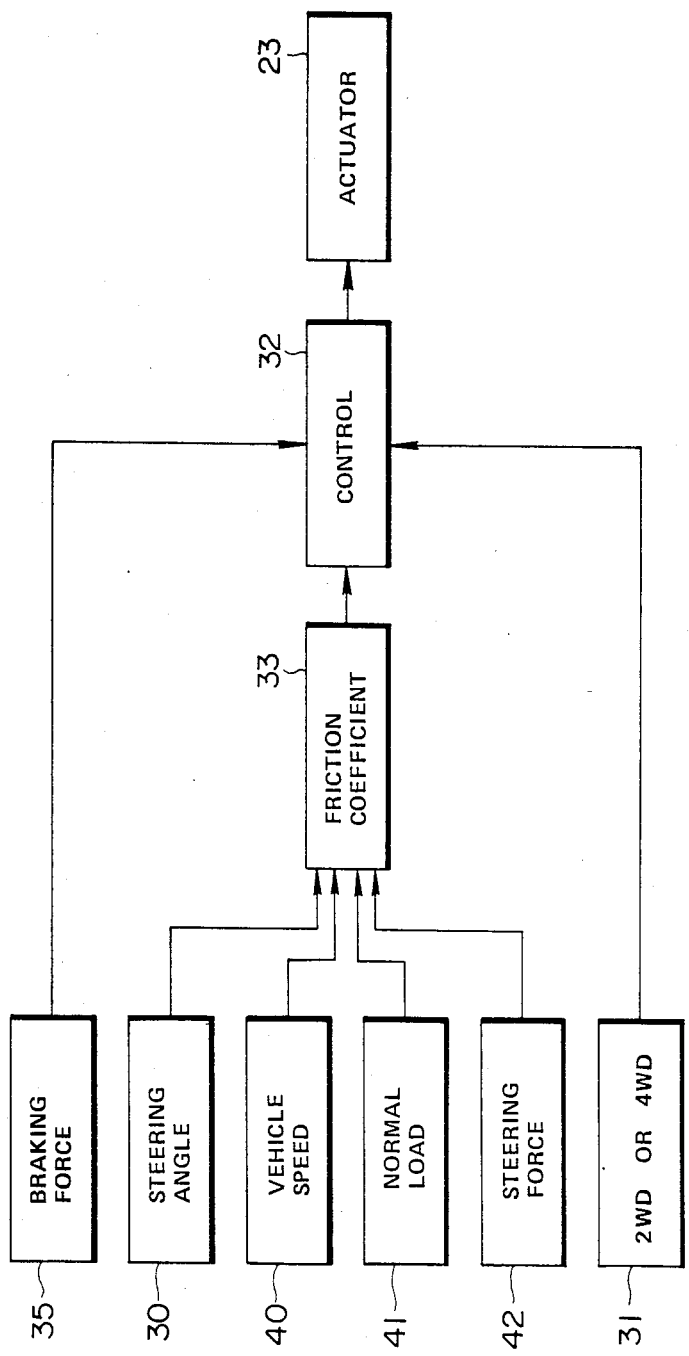

PART-TIME FOUR-WHEEL DRIVE SYSTEM WITH BRAKING FORCE RESPONSIVE CONTROL

BACKGROUND OF THE INVENTION

The present invention relates to a four-wheel drive system of a part-time type having a four-wheel drive mode and a two-wheel drive mode, and more specifically to an automatic control system for a part-time four-wheel drive system, which is arranged to change automatically from the two-wheel mode to the four-wheel mode when the braking force of the vehicle is increased, in order to improve the braking performance.

A four-wheel drive vehicle is superior in ability of hill climbing and ability of rough road driving. If, however, all four wheels are always driven at the same speed, a four-wheel drive vehicle cannot be turned smoothly. During a turn with large steering angles of steerable wheels, the front wheel of an inner or outer side must travel along a circle having a large radius and the rear wheel of the same side must travel along a small circle. Because of this difference in turning radius, there arises a large difference between a rotation speed (an average rotation speed, to be exact) of the front wheels and a rotation speed (an average rotation speed) of the rear wheels. As a result, the steering becomes heavy, the tendency to understeer is increased, and the vehicle cannot be turned without abnormal tire friction (called tight corner brake) which tends to brake the vehicle and cause an engine stall.

To overcome these handling and tire friction problems, some four-wheel drive vehicles are provided with a changeover means capable of changing the state of a four-wheel drive system between a two-wheel drive mode and a four-wheel drive mode. This type of four-wheel drive is called a part-time type. Some examples of the part-time four-wheel drive vehicle are shown in Japanese Patent provisional publications No. 55-83617 and No. 56-75220.

A part-time four-wheel drive vehicle can be turned smoothly in the two-wheel drive mode. Furthermore, a part-time four-wheel drive vehicle has an excellent braking performance when the four-wheel drive mode is used. The front wheels and the rear wheels are forced to rotate integrally by the drive system in the four-wheel drive mode, so that, during hard braking, the front and rear wheels are forced to stop simultaneously. Because of this nature, a part-time four-wheel drive vehicle in the four-wheel drive mode can provide an excellent braking performance. However, the excellent braking performance of a four-wheel drive vehicle can be obtained only when the four-wheel drive mode is used. It is very difficult or practically impossible for a drive to change manually the drive system from the two-wheel drive mode to the four-wheel drive mode during hard braking.

SUMMARY OF THE INVENTION

It is an object of the present invention to provide a part-time type four-wheel drive vehicle which can automatically provide an excellent braking performance.

According to the present invention, a four-wheel drive vehicle comprises an engine, a pair of first wheels and a pair of second wheels, a drive system, and a control system. The drive system is capable of transmitting power from the engine to the first wheels and the second wheels. The drive system comprises changeover means for changing the drive system from a two-wheel drive mode to a four-wheel drive mode and vice versa. The control system comprises means for sensing a braking force of the vehicle, condition sensing means for detecting whether the drive system is in the two-wheel drive mode or the four-wheel drive mode, and control means, connected with the braking force sensing means and the condition sensing means, for controlling the changeover means in accordance with signals of the braking force sensing means and the condition sensing means. The control means is arranged to cause the changeover means to change the state of the drive system from the two-wheel drive mode to the four-wheel drive mode if the sensed braking force of the vehicle is equal to or higher than a predetermined value, and at the same time the drive system is in the two-wheel drive mode.

In one embodiment, the predetermined value of the braking force of the vehicle is constant. In another embodiment, the control system further comprises means for sensing a coefficient of friction between a road surface and a tire of at least one wheel of the vehicle, and the control means varies the predetermined value of the braking force in accordance with the sensed coefficient of friction so that the drive system is changed from the two-wheel mode to the four-wheel mode at a lower braking force level when the coefficient of friction is low.

In disclosed embodiments, the changeover means comprises a clutch and a solenoid valve. The clutch is operated by a fluid pressure, and the solenoid valve controls the fluid pressure. The condition sensing means detects the condition of the drive system by monitoring the fluid pressure for operating the clutch.

BRIEF DESCRIPTION OF THE DRAWINGS

FIG. 5 is a schematic view of a four-wheel drive vehicle of a second embodiment of the present invention, FIG. 6 is a block diagram of a control system of the second embodiment.

DETAILED DESCRIPTION OF THE INVENTION

Figure 2:
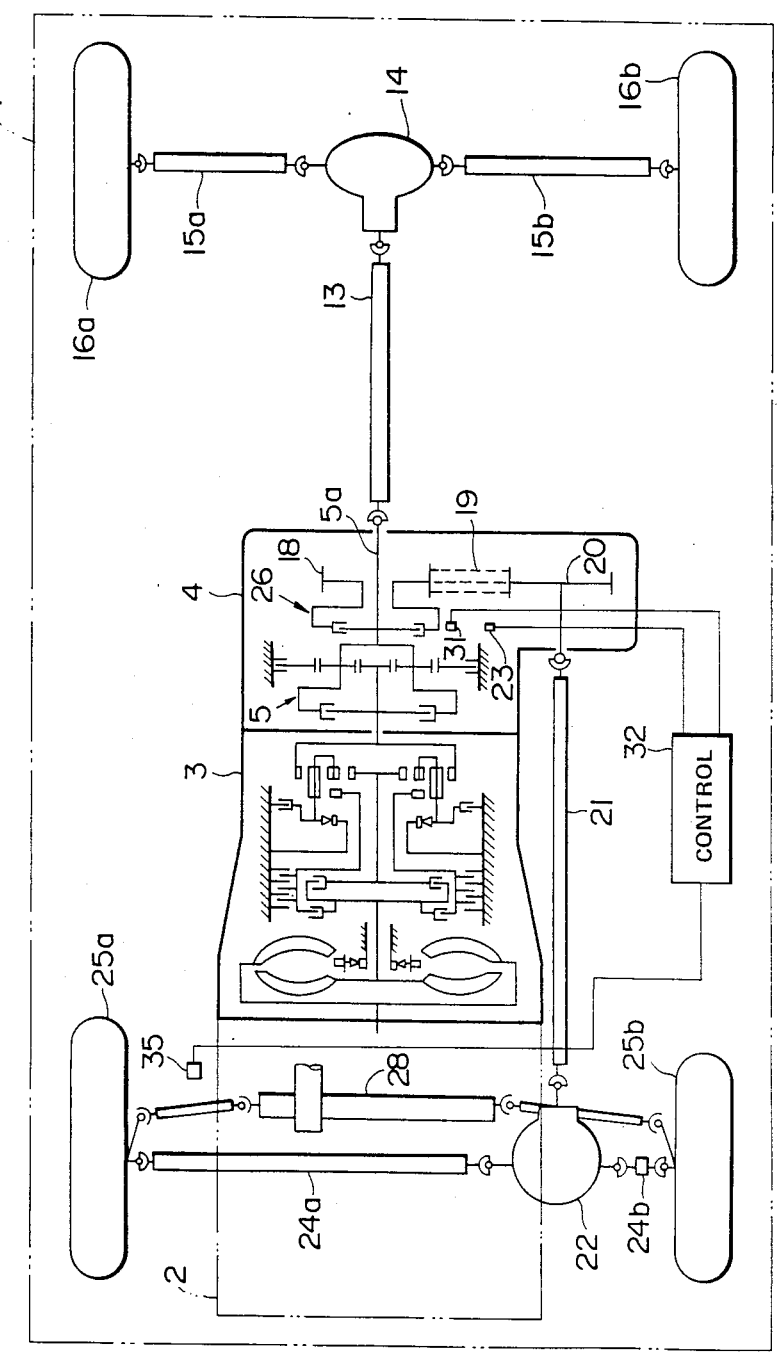
FIG. 2 is a schematic view of a four-wheel drive vehicle of a first embodiment of the present invention.

A first embodiment of the present invention is shown in FIG. 2. An engine 2 is supported on a vehicle body 1. The engine is connected to a main transmission 3. The main transmission 3 is connected to a secondary transmission 4. The secondary transmission 4 has a high-low two-speed change unit 5. The main transmission 3 is connected to the high-low change unit 5 of the secondary transmission 4. The high-low change unit 5 has an output shaft 5a. The output shaft 5a of the high-low unit 5 is connected to one end of a rear propeller shaft 13. The other end of the rear propeller shaft 13 is connected with a rear differential unit 14. The rear differential unit 14 is connected to rear wheels 16a and 16b through rear axle shafts 15a and 15b. The rear differential unit 14 allows the right and left rear wheels 16a and 16b to rotate at different speeds, and thereby absorbs a rotational speed difference between the right and left rear wheels 16a and 16b.

A first chain wheel 18 is rotatably mounted on a middle portion of the output shaft 5a of the high-low unit 5. The first chain wheel 18 is connected with a second chain wheel 20 by a chain belt 19. A shaft of the second chain wheel 20 is connected with one end of a front propeller shaft 21. The other end of the front propeller shaft 21 is connected to a front differential unit 22. The front differential unit 22 is connected with front wheels 25a and 25b through front axles 24a and 24b, respectively. The front differential unit 22 allows the right and left front wheels 25a and 25b to rotate at different speeds, and thereby absorbs a rotational speed difference between the right and left front wheels 25a and 25b.

Figure 3:
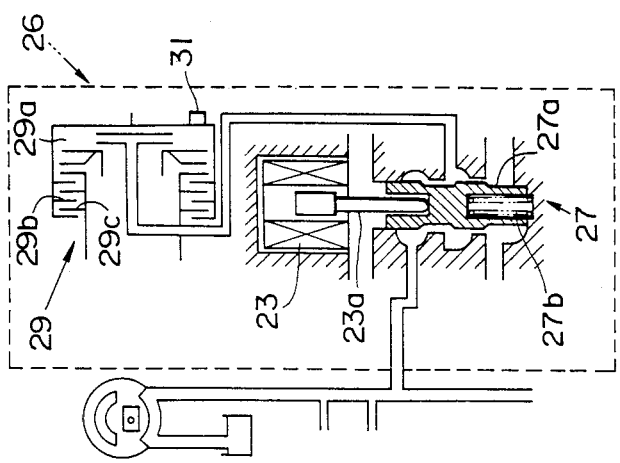
FIG. 3 is a fragmentary sectional schematic view of a 2WD-4WD changeover means used in the vehicle of FIG. 2.

The secondary transmission 4 further has a 2WD-4WD changeover unit 26 disposed between the output shaft 5a of the high-low unit 5 and the first chain wheel 18. As shown in FIG. 3, the changeover unit 26 has a changeover valve 27 connected with a hydraulic system of the vehicle such as the hydraulic system of the transmission 3. The changeover valve 27 has a spool 27a and a spring 27b. The changeover unit 26 has a solenoid 23 having an iron core 23a for moving the spool 27a against the force of the spring 27b The solenoid 23 serves as an actuator of a control system. The changeover unit 26 further has a hydraulic type multiple disc clutch 29. The clutch 29 is operated by an oil pressure of an oil chamber 29a. The oil chamber 29a is fluidly connected with a port of the changeover valve 27. The multiple disc clutch 29 has a group of first clutch plates 29b and a group of second clutch plates 29c. One of the two groups is connected with the output shaft 5a of the high-low unit 5. The other is connected with the first chain wheel 18. The changeover valve 27 can move the spool 27a with the iron core 23a in accordance with the current passing through the solenoid 23, and thereby control the fluid pressure in the oil chamber 29a by controlling the fluid flow. When the oil pressure in the oil chamber 29a is high, the clutch 29 is frictionally engaged and accordingly the drive system is put in the four-wheel drive mode. The clutch 29 is in a slipping state when the oil pressure in the oil chamber 29a is low. When the oil is drained from the oil chamber 29a, the cluch 29 is disengaged and accordingly the drive system is put in the two-wheel drive mode.

The vehicle further has a steering means or mechanism 28 connected with the steerable means or mechanism 28 connected with the steerable front wheels 25a and 25b. The steering mechanism 28 is moved by a steering wheel of the vehicle (not shown).

There is further provided a sensor 31 for detecting whether the drive system is in the four-wheel drive mode or the two-wheel drive mode. In this embodiment, this sensor 31 detects whether the clutch 29 is engaged or not by monitoring the oil pressure in the oil chamber 29a. If the pressure in the oil chamber 29a is equal to or higher than a predetermined pressure value, the condition sensor 31 estimates that the drive system is in the four-wheel drive mode. If there is little or no fluid pressure in the oil chamber 29a, the condition sensor 31 estimates that the drive system is in the two-wheel drive mode.

There is further provided a braking force sensor 35, mounted on the vehicle body 1 which has a brake pedal (not shown), for sensing a braking force of the vehicle. The braking force sensor 35 of this embodiment has at least one strain gage attached to the brake pedal of the vehicle, and an electronic circuit for calculating the braking force of the vehicle from the deflection of the brake pedal.

Figure 4:
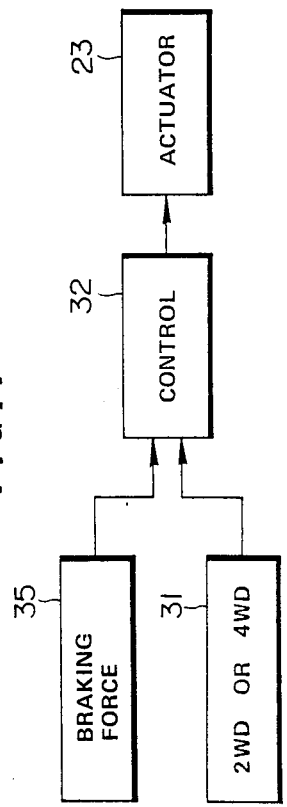
FIG. 4 is a block diagram of a control system of the first embodiment.

A control unit or circuit 32 is connected with the condition sensor 31 and the braking force sensor 35 for receiving signals from both of the sensors 31 and 35. The control circuit 32 produces a control signal in accordance with the signals of both sensors, and send the control signal to the solenoid (actuator) 23. Thus, a control system is formed as shown in FIG. 4.

Figure 1:
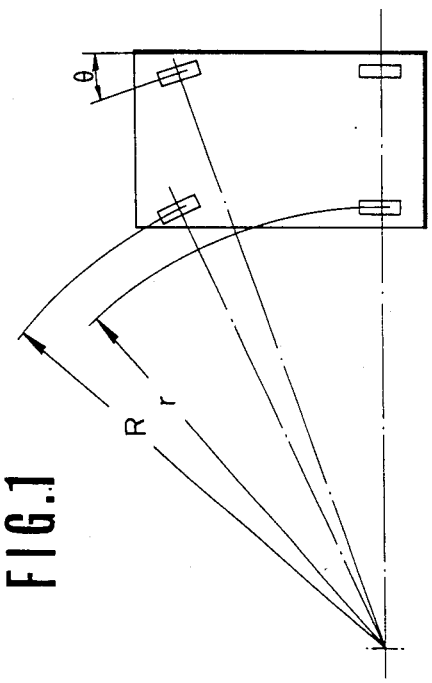
FIG. 1 is a plan view of a vehicle, for showing a turning radius difference between front wheels and rear wheels when steering angles of steerable wheels are large.

When the drive system is in the two-wheel drive mode the drive system works in the following manner. When the steering angles $\theta$ of the steerable front wheels 25a and 25b are increased, the radii (R) of arc-shaped paths traveled by the front wheels 25a and 25b become largely different from the radii (r) of arc-shaped paths traveled by the rear wheels 16a and 16b, as shown in FIG. 1. (In FIG. 1, only the paths of the inside front and rear wheels are shown.) Consequently, there arises a large difference between the average rotation speed of the front wheels 25a and 25b and the average rotation speed of the rear wheels 16a and 16b. The drive system in the two-wheel drive mode absorbs this average rotation speed difference between the front and rear wheels, so that the vehicle can turn smoothly though the steering angles $\theta$ are large.

If the brakes are applied hard on the vehicle while the vehicle is running with the drive system held in the two-wheel drive mode, and the braking force of the vehicle becomes equal to or higher than a predetermined value, the braking force sensor 35 detects this condition and produces a signal. At the same time, the condition sensor 31 detects the fact that the clutch 29 is not engaged and the drive system is in the two-wheel drive mode, and produces a signal. When both signals of the braking force sensor 35 and the condition sensor 31 are inputted to the control unit 32, it sends its control signal to the actuator or solenoid 23 to command the changeover unit 26 to change the condition of the drive system from the two-wheel drive mode to the four-wheel drive mode. In response to the control signal, the current supply to the solenoid 23 is gradually increased, and accordingly the changeover valve 27 increases the oil pressure in the oil chamber 29a by moving the spool 27a downwards in FIG. 3. When the oil pressure in the oil chamber 29a is increased, the clutch 29 is engaged, and brings the drive system to the four-wheel drive mode. As a result, the front wheels 25a and 25b and the rear wheels 16a and 16b are forced to rotate integrally by the drive system. Therefore, during a hard stop, the front and rear wheels are forced to stop rotating at the same time, so that excellent braking performance can be obtained without the driver's manual operation of the clutch.

The braking force sensor 35 of this embodiment is arranged to determine the braking force of the vehicle by sensing the deflection of brake pedal. However, the braking force sensor 35 can be arranged to sense some other variable from which the braking force can be determined. For example, the braking force sensor 35 may be arranged to determine the braking force by sensing an oil pressure of a brake master cylinder of the brake system.

A second embodiment of the present invention is shown in FIGS. 5 and 6. In addition to the braking force sensor 35 and the condition sensor 31, the control system of the second embodiment has a means for sensing a coefficent of friction between a road surface and at least one tire. When the coefficient of friction between the tires and road surface is low, the frictional braking force of the vehicle is reduced, and accordingly the braking effectiveness is reduced. The control system of the second embodiment is arranged to vary the predetermined value of the braking force of the vehicle in accordance with the coefficient of friction so as to improve the braking effectiveness. As shown in FIG. 5, the four-wheel drive vehicle of this embodiment is provided with a steering angle sensor 30 mounted on the vehicle body 1 near the steering mechanism 28. The steering angle sensor 30 senses steering angles of the steerable wheels 25a and 25b by sensing the movement of the steering means 28. A vehicle speed sensor 40 is mounted on the vehicle body 1 near the output shaft 5a of the high-low speed change unit 5. The vehicle speed sensor 40 senses the vehicle speed by sensing the rpm of the output shaft 5a. A normal load sensor 41 is mounted on the vehicle body 1 near the steerable front wheel 25a. The normal load sensor 41 senses, by estimate, a force acting in a vertical direction on the contact surface between the tire of the front wheel 25a and the road. A steering force sensor 42 is disposed in the steering means 28. The steering force sensor 42 senses a steering force produced by the movement of the steering wheel of the vehicle. There is further provided a friction coefficient calculating unit 33. As shown in FIG. 6, the friction coefficient calculating unit 33 is connected with the steering angle sensor 30, the vehicle speed sensor 40, the normal load sensor 41 and the steering force sensor 42 so as to receive signals from these sensors. From the signals of these sensors 30, 40, 41 and 42, the friction coefficient calculating unit 33 calculates the coefficient of friction between the tire of the steerable front wheel 25a and the road surface.

The coefficient of friction between the tire and road surface can be calculated in the following manner. The following is an equation (quoted from Jidosha Kogaku Hand Book (Automotive Engineers' Hand Book) compiled by Society of Automotive Engineers of Japan, 1981, p. 8–16) for obtaining a moment M which rotates or tends to rotate a steerable wheel of a moving vehicle about its kingpin.

$$M = N \sin\zeta \sin\phi e \, (r + Rw \sin\zeta \cos\phi e) +$$
$$S \, Rw \sin\zeta \sin\phi e \cos\zeta + S \, Xs \cos\zeta + N f r \cos\zeta$$

In this equation,
N is a load acting in a vertical direction on a contact surface between the tire of the steerable wheel (25a) and the road,
r is a scrub radius,
Rw is an effective radius of the tire,
S is a force (side force) acting in a horizontal direction perpendicular to a direction of tire movement in the tire to road contact surface,
Xs is expressed by Xs=Tsat/S wherein Tsat is a self aligning torque,
f is the coefficient of friction between the tire of the steerable wheel (25a) and road surface, $\zeta$ is expressed by $\tan^2\zeta = \tan^2\delta + \tan^2\beta$ where $\delta$ is a kingpin inclination (steering axis inclination), and $\beta$ is a caster angle, and
$\phi e$ is a steering angle of the steerable wheel (25a).

In this equation, r and Rw are quantities which are determined from the make (the specifications) of the vehicle. The quantity $\zeta$ is also known because $\delta$ and $\beta$ are determined by the make of the vehicle. The moment M is a quantity which is known from the steering force, so that the moment M can be determined by sensing the steering force. The load N is determined by the normal load sensor 41. The side force S is given by S=Nfs where fs is a coefficient of a sidewise sliding friction. The coefficient fs is a quantity varying with the vehicle speed, so that an approximate value of the side force S can be determined by the values sensed by the normal load sensor 41 and the vehicle speed sensor 40. The self aligning torque Tsat is known from the make of the vehicle and the steering angle of the steerable wheel (25a). Therefore, an approximate value of Xs can be determine by sensing the steering angle of the steerable wheel, the vehicle speed, and the normal load. Finally, only the coefficient of friction f between the tire and road surface remain unknown in the above equation. Therefore, the friction coefficient calculating unit 33 is arranged to determine an approximate value of the coefficient of friction f between the tire and road surface from the signals from the steering angle sensor 30, the vehicle speed sensor 40, the normal load sensor 41 and the steering force sensor 42. The friction coefficient calculating unit 33 sends a signal indicative of the result of the calculation to the control unit 32.

Upon receipt of the signal of the friction coefficient calculating unit 33, the control unit 32 determines a value of the braking force of the vehicle in accordance with the coefficient of friction determined by the friction coefficient calculating unit 33. Then, the control unit 32 stores the determined value. The control unit 33 determines the value of the braking force so that the value of the braking force is low when the coefficient of friction determined by the friction coefficient sensing means is low. If the control unit 32 receives the signals from the braking force sensor 35 and the condition sensor 31, and determines that the sensed braking force of the vehicle is equal to or higher than the value of the braking force determined and stored by the control unit 32, and at the same time the clutch 29 of the changeover unit 26 is not engaged, then the control unit 32 sends the control signal to the solenoid 23 to actuate the changeover unit 26 to engage the clutch 29 to change the drive system from the two-wheel drive mode to the four-wheel drive mode. Thus, the control system of this embodiment can improve the braking performance even when the coefficient of friction between the tire and road surface is low.

What is claimed is:
1. A four-wheel drive vehicle comprising:
an engine,
a pair of first wheels and a pair of second wheels,
a drive system capable of transmitting power from said engine to said first wheels and said second wheels, said drive system comprising changeover means for changing said drive system from a two-wheel drive mode to a four-wheel drive mode and vice versa, and
a control system comprising
means for sensing a braking force of the vehicle, condition sensing means for detecting whether said drive system is in the two-wheel drive mode or the four-wheel drive mode, and control means, connected with said braking force sensing means and said condition sensing means, for controlling said changeover means in accordance with signals of said braking force sensing means and said condition sensing means, said control means being arranged to cause said changeover means to change the state of said drive system from the two-wheel drive mode to the four-wheel drive mode if the sensed braking force of the vehicle is equal to or higher than a predetermined value, and at the same time said drive system is in the two-wheel drive mode.

2. A four-wheel drive vehicle according to claim 1, wherein said changeover means has an engaged state and a disengaged state, said drive system being in the four-wheel drive mode when said changeover means is in the engaged state, and in the two-wheel drive mode when said changeover means is in the disengaged state, said changeover means preventing said drive system from transmitting power from said engine to said first wheels when said changeover means is in the disengaged state, said changeover means always allowing said drive system to transmit power from said engine to said second wheels.

3. A four-wheel drive vehicle according to claim 2, wherein said first wheels are front wheels of the vehicle, and said second wheels are rear wheels of the vehicle.

4. A four-wheel drive vehicle according to claim 3, wherein said condition sensing means detects the condition of said drive system by detecting whether said changeover means is in the engaged state or the disengaged state.

5. A four-wheel drive vehicle according to claim 4, wherein said drive system comprises a first drive member adapted to be driven by said engine, and connected to said rear wheels for driving said rear wheels, and a second drive member connected to said front wheels for driving said front wheels, and wherein said changeover means comprises a clutch disposed between said first and second drive members, said clutch being engaged to connect said second drive member with said first drive member so that said second drive member can be driven by said engine through said first drive member when said clutch is in the engaged state, said clutch being disengaged to disconnect said second drive member from said first drive member.

6. A four-wheel drive vehicle according to claim 5, wherein said clutch is operated by a fluid pressure, and said changeover means further comprises actuating means for actuating said clutch by controlling the fluid pressure.

7. A four-wheel drive vehicle according to claim 6, wherein said condition sensing means monitors the fluid pressure.

8. A four-wheel drive vehicle according to claim 7, wherein said control means controls the fluid pressure by controlling said actuating means.

9. A four-wheel drive vehicle according to claim 8, wherein said actuating means comprises a solenoid valve.

10. A four-wheel drive vehicle according to claim 9, wherein said drive system further comprises a front differential disposed between the right and left front wheels, and a rear differential disposed between the right and left rear wheels.

11. A four-wheel drive vehicle according to claim 10, wherein said braking force sensing means comprises at least one strain gage attached to a brake pedal of the vehicle.

12. A four-wheel drive vehicle according to claim 10, wherein said braking force sensing means monitors a fluid pressure of a master cylinder of a brake system of the vehicle.

13. A four-wheel drive vehicle according to claim 1, wherein said control system means further comprises friction coefficient sensing means for sensing a coefficient of friction between a road surface and a tire of at least one of the wheels of the vehicle, said control means being connected with said friction coefficient sensing means to receive a signal therefrom, said control means determining the predetermined value of the braking force in accordance with the sensed coefficient of friction so that the predetermined value which said control means determines when the sensed coefficient of friction is at a low level is lower than the predetermined value which said control means determines when the sensed coefficient of friction is at a high level higher than the low level.

14. A four-wheel drive vehicle according to claim 13, wherein said control means decreases the predetermined value of the braking force as the sensed coefficient of friction decreases.

15. A four-wheel drive vehicle according to claim 14, wherein said friction coefficient sensing means comprises steering angle sensing means for sensing a steering angle of at least one steerable wheel of the vehicle, vehicle speed sensing means for sensing the speed of the vehicle, load sensing means for sensing a force acting vertically on a contact surface between a road and the tire of the steerable wheel, and steering force sensing means for sensing a steering force.

16. A four-wheel drive vehicle according to claim 15, wherein said friction coefficient sensing means further comprises friction coefficient calculating means connected with said steering angle sensing means, said vehicle speed sensing means, said load sensing means, and said steering force sensing means, for calculating the coefficient of friction between a road surface and at least one steerable wheel of the vehicle from the steering angle of the steerable wheel, the vehicle speed, the load, the steering force sensed by these sensing means.

* * * * *